United States Patent [19]

Smith

[11] Patent Number: 5,638,632

[45] Date of Patent: Jun. 17, 1997

[54] ARTIFICIAL FISHING LURE

[75] Inventor: Donald L. Smith, deceased, late of Visalia, Calif., by Evelyn Burnett Smith Bradley, executrix

[73] Assignee: Douglas C. Smith, Minneapolis, Minn.

[21] Appl. No.: 410,140

[22] Filed: Mar. 23, 1995

[51] Int. Cl.⁶ .................................................. A01K 85/00
[52] U.S. Cl. ........................... 43/42.45; 43/42; 43/24
[58] Field of Search ............................ 43/42.45, 42.23, 43/42.24, 42.05, 42.47

[56] References Cited

U.S. PATENT DOCUMENTS

| | | | |
|---|---|---|---|
| 1,777,004 | 9/1930 | Lemere et al. . | |
| 1,855,097 | 4/1932 | Chamberlaine et al. . | |
| 2,239,802 | 4/1941 | Westby . | |
| 2,644,265 | 10/1953 | Stettner | 43/42.47 |
| 2,938,293 | 5/1960 | Richardson | 43/42.24 |
| 3,967,406 | 7/1976 | Anderson | 43/42.24 |
| 4,164,826 | 8/1979 | Metzler et al. | 43/42.05 |
| 4,667,434 | 5/1987 | Newell | 43/42.47 |
| 5,168,652 | 12/1992 | Davis | 43/42.23 |
| 5,182,875 | 2/1993 | Righetti | 43/42.24 |

Primary Examiner—Joseph J. Hail, III
Assistant Examiner—L.-H. Lin
Attorney, Agent, or Firm—Merchant, Gould, Smith, Edell, Welter & Schmidt, P.A.

[57] ABSTRACT

An artificial fishing lure having an elongated S-shaped body, a line attaching eyelet; and a pair of treble hooks is provided. The body includes a front head portion, a rear tail portion, a top portion, a belly portion, and two side portions. The line attaching eyelet is located at the front head portion of the body. The treble hooks are attached to the belly of the body and the rear of the body. Hydrodynamic resistance resulting from the S-shaped body causes the lure to oscillate about its longitudinal axis and follow an arcuate path through water, thus serving to attract fish.

17 Claims, 5 Drawing Sheets

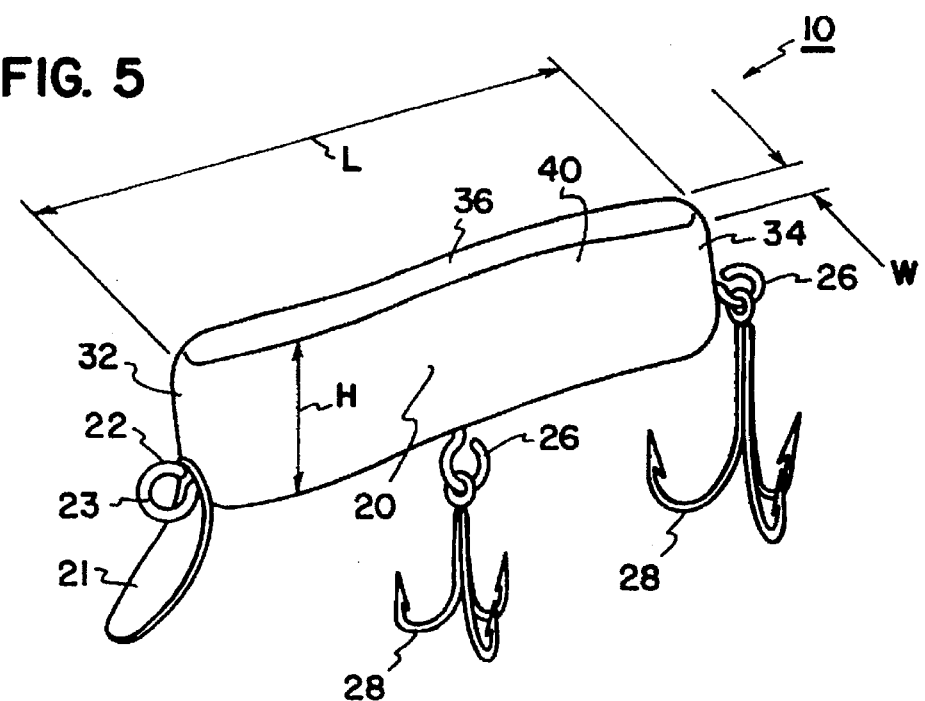
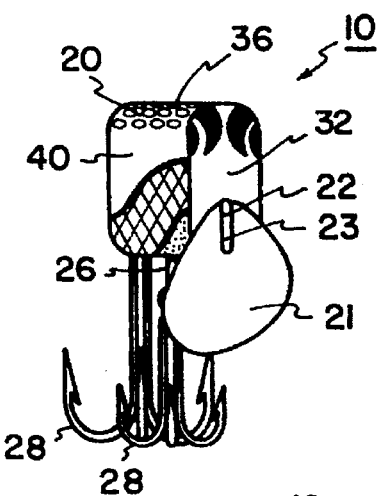
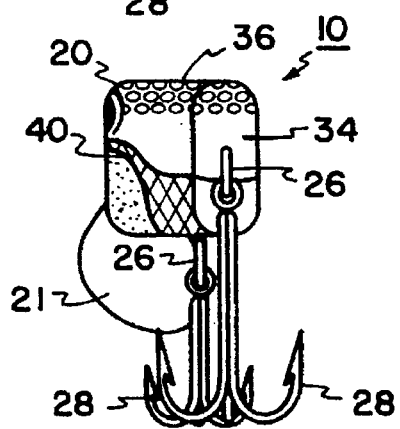

FIG. 8A
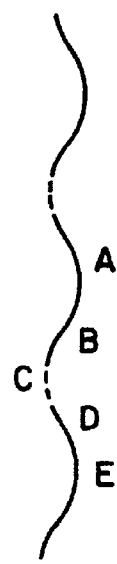
FIG. 8B  FIG. 8C  FIG. 8D  FIG. 8E  FIG. 8F
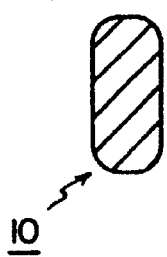 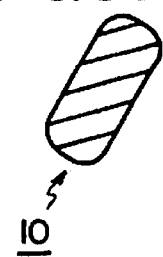 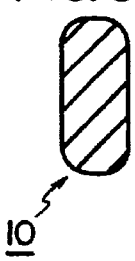  
FIG. 9
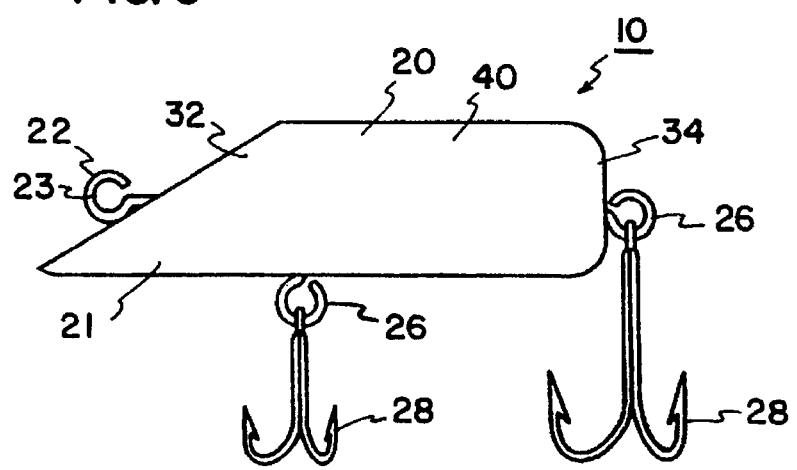

FIG. 13A
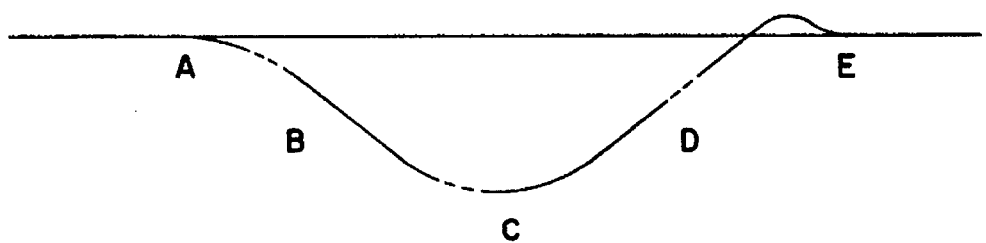
FIG. 13B  FIG. 13C  FIG. 13D  FIG. 3E  FIG. 13F
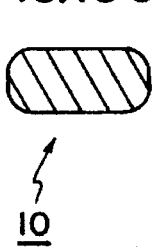
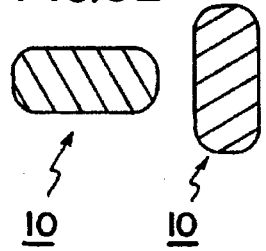

ARTIFICIAL FISHING LURE

FIELD OF THE INVENTION

The present invention relates to an artificial fishing lure of novel shape. The shape enables the lure to imitate the appearance and action of natural fish prey.

BACKGROUND OF THE INVENTION

For years, various types of artificial fishing lures have been used by anglers to imitate the look and action of natural prey upon which fish feed. Examples include U.S. Pat. No. 1,855,097 to Chamberlaine, U.S. Pat. No. 2,239,802 to Westby, and U.S. Pat. No. 4,667,434 to Newell. Most of these lures fail to simulate the natural action or appearance of bait, present the appearance of only one form of bait, and are incapable of multiple actions.

It is known that different species of fish prefer different types of prey, and that the prey vary in appearance and action. Unfortunately, existing lures are not capable of providing multiple appearances or multiple actions. In essence, existing fishing lures are one dimensional.

SUMMARY OF THE INVENTION

These problems have been alleviated by providing a multidimensional lure with a novel design and function. In accordance with a preferred embodiment of the present invention, an artificial fishing lure is provided. A preferred embodiment of the fishing lure has an elongated double arcuate, S-shaped body; a line attachment; and a pair of treble hooks. The body includes a front head portion, a rear tail portion, a top portion, a belly portion, and two side portions. In one embodiment, each portion is patterned to simulate the look of various fish prey. The line attachment includes an eyelet which is located at the front head portion of the body. The treble hooks are attached to the belly of the body and the rear of the body.

When a fishing line is attached to the lure and the lure is drawn through water, hydrodynamic force causes the lure to partially rotate about its longitudinal axis while following an arcuate path through the water. This action increases the accuracy of the simulated lure appearances by providing "natural" bait action.

Additionally, a diving lip may be attached to the front of the lure. The diving lip will enable the lure to be used below the surface. The depth below the surface varying with the angle of the lip relative to the longitudinal plane of the lure.

In an alternate preferred embodiment, the lure is provided with a diving lip at the front head portion, and the eyelet of the line attachment is forwardly located on a side of the body. When attached to fishing line and drawn through water, this novel arrangement provides a unique action. The lure simultaneously rotates about its longitudinal axis while it dives and surfaces. The lure completes a half roll, i.e. a 180 degree rotation about its longitudinal axis, as it bottoms out. The lure completes its roll as it surfaces. Following a splash, the action is then repeated. The motion and noise generated by the splash attract fish more readily than the prior art.

Finally, it is an object of the present invention to provide an artificial fishing lure which presents different appearances by simulating the look of different prey when viewed from different angles.

The above described features and advantages along with other advantages and features of novelty are pointed out with particularity in the claims of the present invention. However, for a better understanding of the invention, its advantages, and object attained by its use, reference should be made to the drawings which form a further part of the present application and to the accompanying descriptive matter in which there is illustrated and described preferred embodiments of the present invention.

BRIEF DESCRIPTION OF THE DRAWINGS

In the drawings, wherein like reference numerals and letters indicate corresponding elements throughout the several views:

FIG. 5 shows a front left perspective view of the fishing lure shown in FIG. 1;

FIG. 6 shows a front elevational view of the fishing lure shown in FIG. 1;

FIG. 7 shows a rear elevational view of the fishing lure shown in FIG. 1;

FIG. 8A shows a top plan view of the action of the fishing lure shown in FIG. 1 when the lure is drawn through water;

FIGS. 8B–8F show front cross-sectional views of the body of the fishing lure shown in FIG. 1 when the lure is at the positions in FIG. 8A;

FIG. 9 shows a right side elevational view of the fishing lure shown in FIG.1 with the diving lip integrally formed by the body;

FIG. 13A shows the action of the fishing lure shown in FIG. 10 when the lure is drawn through water; and FIGS. 13B–13F show front cross-sectional views of the body of the fishing lure shown in FIG. 10 when the lure is at the positions in FIG. 13A.

DETAILED DESCRIPTION OF THE PREFERRED EMBODIMENTS

Figure 1:
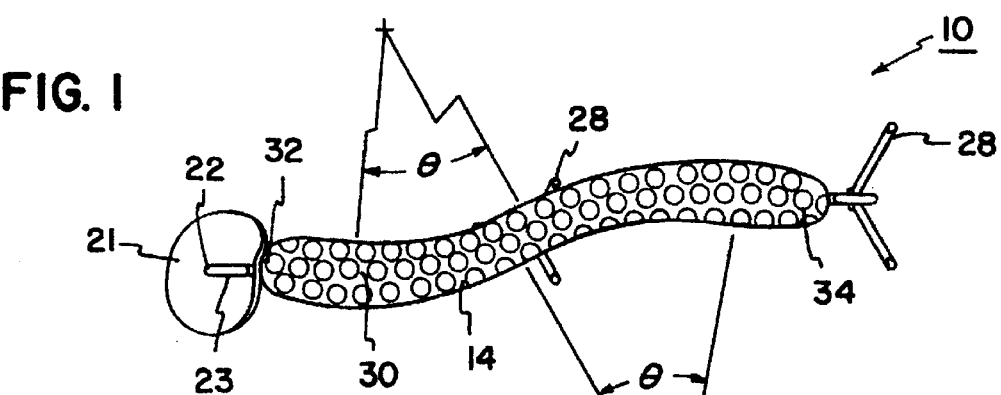
FIG. 1 shows top plan view of a fishing lure according to the principles of the present invention.

Referring now to the drawings and specifically to FIGS. 1–7, a preferred embodiment of the artificial fishing lure, generally designated 10, is shown provided with an elongated, S-shaped body 20, a line attachment 22, a diving lip 21 and a pair of treble hooks 28. The body 20 includes a front head portion 32, a rear tail portion 34, a top portion 36, a belly portion 38, and two side portions 40. The lure 10 may be constructed of any of a variety of materials, such as wood, plastics, or composites.

As best shown in FIG. 1, the S-Shaped body 20 includes two curved portions, a front curved portion 14 and a rear curved portion 15. Preferably, each curved portion 14 and 15 subtends an angle θ of 35 ±15 degrees, as schematically shown most clearly in FIG. 1. However, it should be appreciated that the curved portions 14 and 15 can subtend an angle θ greater than 50 degrees and less than 20 degrees without impeding the function of the lure 10. The length L to height H to width W ratio is preferably 10: 2: 1 ±20%, as best shown in FIG. 5. However, it should be appreciated that these ratios may vary by more than 20% without significantly affecting the function of the lure 10. Additionally, it should be appreciated that the length L, height H, and width W of the body 20 vary depending on the size of the prey to be simulated. For example, larger fish such as muskellunge and northern pike prefer larger lures whereas smaller fish such as walleye and bass will prefer smaller lures.

The line attachment 22 includes a front line eyelet 23 which is located at the front head portion 32 of the body 20, as best shown in FIG. 5. The front line eyelet 23 is typically screwed into the lure 10, although it could be integrally molded with the body 20, either as an extrusion or an aperture. The front line eyelet 23 provides a place for attaching fishing line. Preferably, a swivel leader is disposed between the line and the front line eyelet 23 to prevent the line from twisting.

Figure 4:
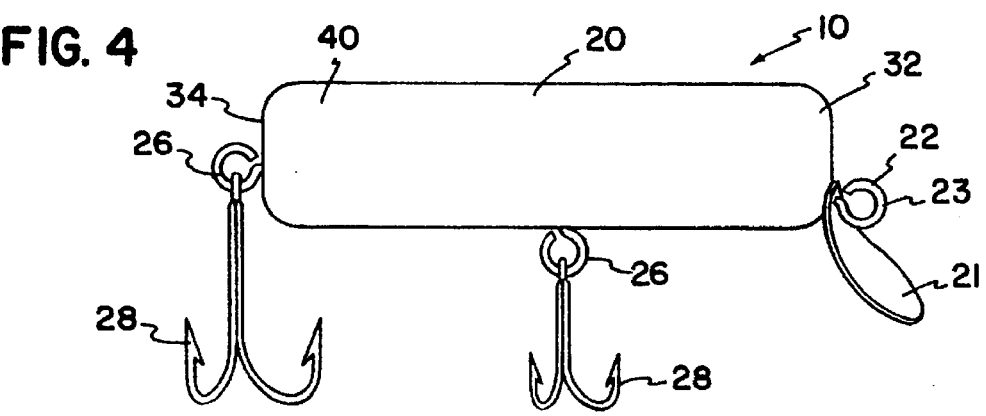
FIG. 4 shows a left side elevational view of the fishing lure shown in FIG.1.

As best shown in FIGS. 4 and 5, The hooks 28 of the preferred embodiment are secured to the body 20 at the belly portion 38 and at the tail portion 34. The hooks 28 are secured to the body 20 via hook eyelets 26. The hook eyelets 26 are secured to the body 20 in substantially the same manner as the front line eyelet 23 as described above. The hook 28 secured at the belly portion 38 is positioned forwardly from the hook 28 secured at the tail portion 34 such that the hooks 28 generally will not interact and negatively affect the action of the lure. It should be appreciated that the number of hooks 28 may vary from one to a plurality, and the location of hooks 28 may be on the belly portion 38, tail portion 34, or side portions 40.

As best shown in FIG. 5, the diving lip 21 typically has an aperture through which the front line eyelet 23 is displaced such that the front line eyelet 23 retains the diving lip 21 at the front portion 32 of the body, extending forwardly and downwardly therefrom. The diving lip 21 is preferably constructed of metal, though it may also be constructed of plastic, composite, or any other suitable material. Additionally, the diving lip 21 may be screwed into the body portion 38 of the lure 10 or formed integrally with the body 20 by manufacturing the body 20 such that the front head portion 32 is angled with respect to the longitudinal plane AA', as shown in FIG. 9.

In operation, the fishing lure 10 in accordance with the first preferred embodiment of the invention is attached to fishing line and cast by a fisher into a body of water. The action of the lure is best shown in FIGS. 8A–8F. When the lure 10 is drawn through water e.g. by trolling, jerking the line, or reeling the line, hydrodynamic force causes the lure 10 to partially rotate about its longitudinal axis AA' while following an arcuate path through the water, as shown in FIG. 8A. Specifically, the degree of rotation of the fishing lure 10 about its longitudinal axis AA' at a given point along its arcuate path is indicated by the letters in FIG. 8A, wherein the letters B–F correspond to the position shown in FIGS. 8B–8F. For example, at position B in FIG. 8A, the lure 10 is oriented as shown in FIG. 8B, and at position C in FIG. 8A, the lure 10 is oriented as shown in FIG. 8C.

Figure 10:
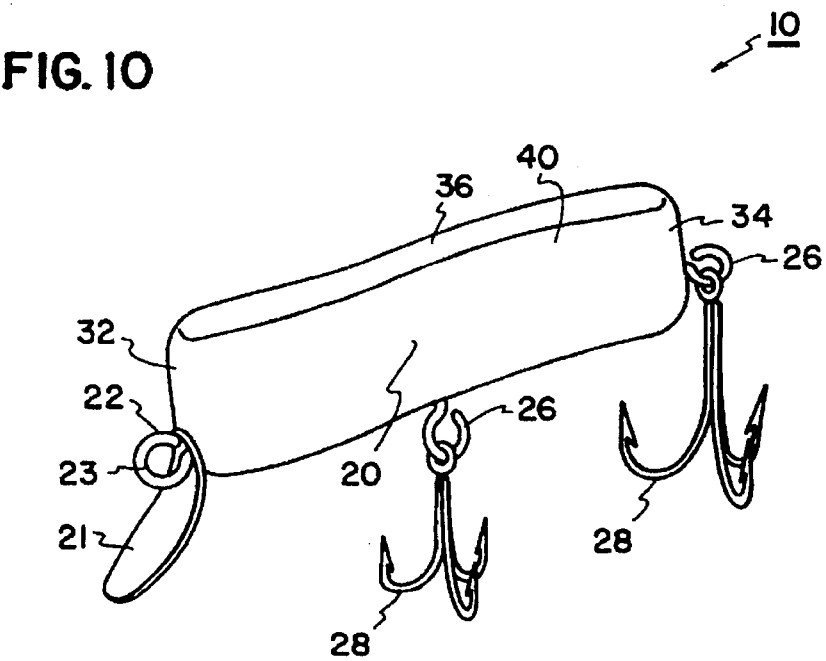
FIG. 10 shows a front right perspective view of the fishing lure shown in FIG. 1 without a diving lip.

In the first preferred embodiment, the action of the lure 10 is subsurface at a downward angle to the water surface. However, for surface action, it should be appreciated that the diving lip 21 may be removed, as best shown in FIG. 10. When drawn through water, the lure 10 without a diving lip 21 achieves a similar action to that described above and depicted in FIG. 8, with the difference being that the action is on the water surface.

Figure 2:
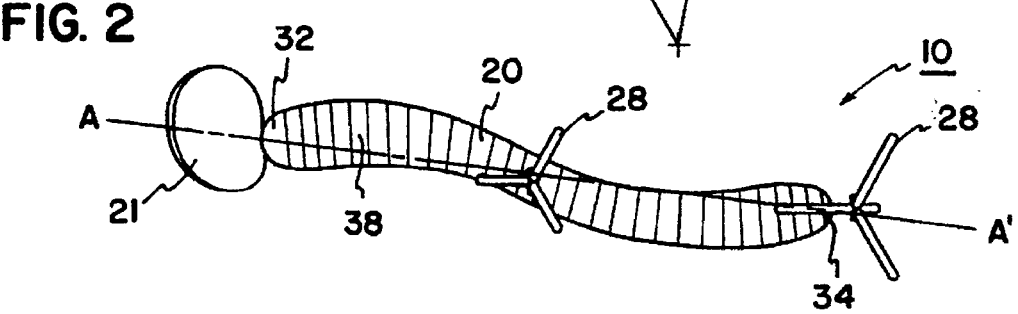
FIG. 2 shows a bottom plan view of the fishing lure shown in FIG. 1.
Figure 3:
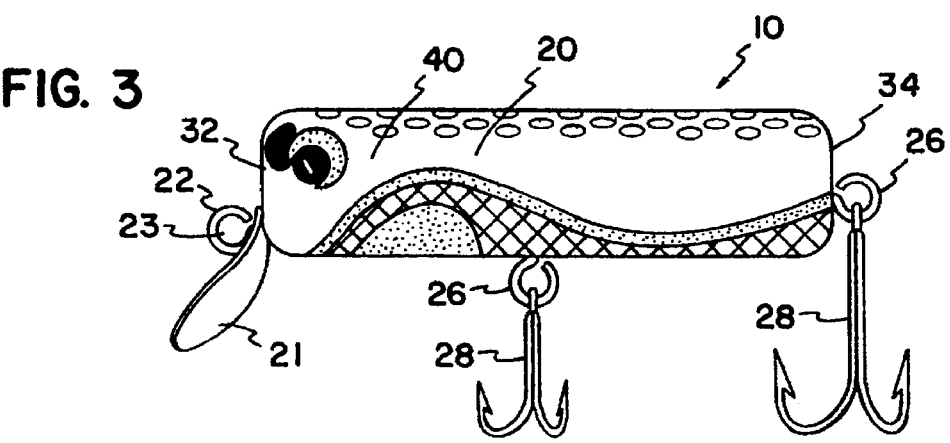
FIG. 3 shows a right side elevational view of the fishing lure shown in FIG.1.

As shown most clearly in FIG. 2, the belly portion 38 is patterned such that the lure 10 appears as a worm from below. As shown in FIGS. 3 and 4, the lower half of the side portions 40 and part of the bottom portion 38 are patterned to present the appearance of a fish. The upper half of the side portions 40 and the top portion 36 are patterned such that the lure 10 appears as fish when viewed from directly above and as a bug when viewed from the front and at angles to the front. Moreover, when viewed from an angle, the pattern combined with the S-shape of the body 20 give the lure 10 an appearance of a plump bug, as best shown in FIG. 6. It should be appreciated that the patterns on the various portions of the body 20 may be changed such that the lure 10 presents the appearance of solely a fish, solely a bug, or different types of bugs, fish, or other natural bait. Moreover, it should be appreciated that the size of the lure 10 may vary such as to change the appearance of the size of the imitated bait. Thus, the lure 10 has the advantage of presenting multiple appearances, i.e. simulating the look of different prey, and these appearances directly result from the combination of the shape and patterns of the lure 10.

Figure 11:
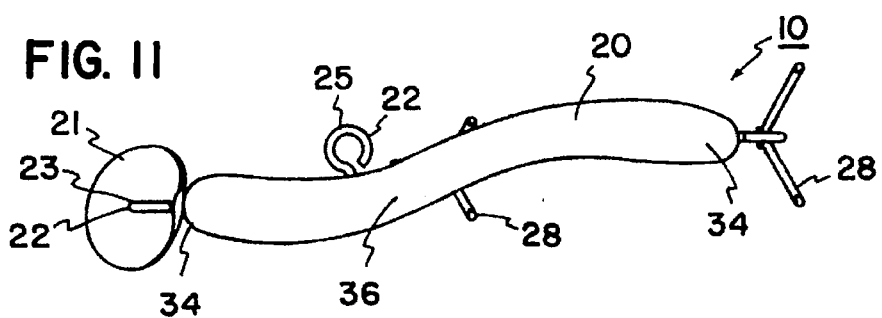
FIG. 11 shows a top plan view of an alternate embodiment of a fishing lure according to the principles of the present invention.
Figure 12:
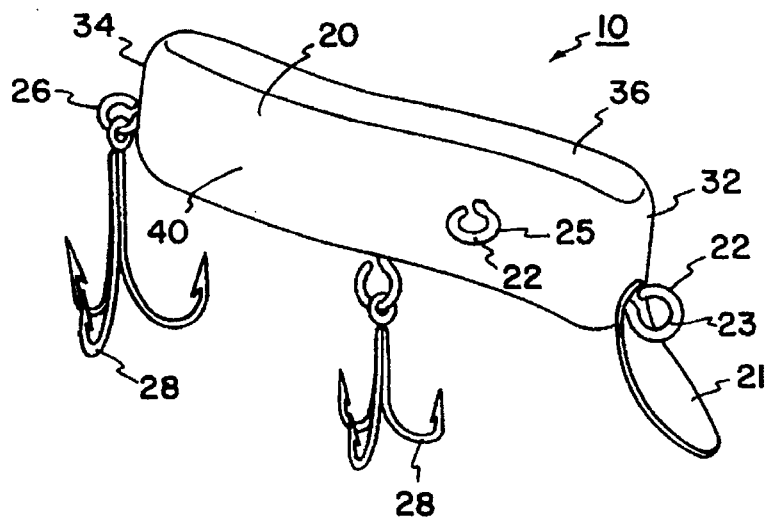
FIG. 12 shows a front left perspective view of the fishing lure shown in FIG. 10.

In a second embodiment, as shown in FIGS. 11 and 12, the body 20 includes a front line eyelet 23 and a side line eyelet 25. The front line eyelet 23 is located at the front head portion 32 and the side line eyelet 25 is located on a side portion 40. Both the front line eyelet 23 and the side line eyelet 25 attach to the body 20 in the same manner as described above with respect to the first preferred embodiment. Additionally, the lure 10 of this embodiment further includes a diving lip 21. The location, attachment, and construction of the diving lip 21 are substantially as described in the first embodiment.

In operation, the fishing lure 10 in accordance with the second preferred embodiment of the invention is attached to fishing line via the side line eyelet 25 or the front line eyelet and cast by a fisher into a body of water. When the fishing line is attached to the front line eyelet 23, the retrieval action is as described above with respect to the first preferred embodiment.

However, another novel retrieval action results when the fishing line is attached to the side line eyelet 25. When the lure 10 is drawn through water, e.g. by trolling, jerking the line, or reeling the line, hydrodynamic force causes the lure 10 to spiral through the water, as best shown in FIG. 13A. The lure 10 dives and turns such that when it reaches peak depth, as shown as pt. D in FIG. 13A, the lure 10 has rotated 180 degrees. At such a position, the diving lip 21 is angled upward, thus hydrodynamic force propels the lure 10 to the surface. The lure 10 completes a full, 360 degree, rotation as it surfaces, as shown as pt. F in FIG. 13A, and is then in position to repeat its action. Specifically, the degree of rotation of the fishing lure 10 about its longitudinal axis AA' at a given point along its spiral path is indicated by the letters B–F in FIG. 13A wherein the letters refer to FIGS. 13B–13F.

The surfacing of the lure 10 causes a splash. The noise generated by the splash further serves to attract fish. The spiralling action achieved by the second embodiment presents the appearance of wounded and/or frightened prey, and it is common knowledge that wounded prey are aggressively attacked by predators. In combination, the noise and action provide a fishing lure with unprecedented ability to simulate natural prey and thus attract fish.

In addition to the novel retrieval action, the invention of the second embodiment provides a fishing lure 10 capable of multiple action with little manual intervention. Specifically, through the use of a leader, a fisher may switch from one action to the other merely by switching the leader between the front line eyelet 23 and the side line eyelet 25. The versatility of the lure 10 thus enables a fisher to quickly switch between two desired actions.

It should be appreciated that the front line eyelet 23 of the second embodiment can be excluded to form yet another embodiment. In this third embodiment, the location, attachment, and construction of the diving lip 21 are substantially as described above. However, rather than a front line eyelet 23 retaining the diving lip 21, the diving lip 21 is retained by a screw.

Numerous other advantages are attained which are common to all of the possible embodiments. The invention provides a lure 10 which achieves the same action regardless of how the lure 10 strikes the water. More specifically, the S-shaped body 20 causes the lure 10 to oscillate. The oscillations serve to release the hooks 28 from each other should they become entangled. As a result, the lure 10 produces a consistent action.

The present invention provides for a weedless lure 10. When drawn through the water, the S-shaped body 20 of the lure 10 causes an action in which the nose, or front portion of the lure 32, pushes weeds away from the hooks 28; thus preventing the lure 10 from snagging weeds.

Finally, the S-shaped body 20 of the present invention provides a contour which is easy to grasp. Thus, the invention enables a fisher to unhook fish with ease.

While certain representative embodiments of the present invention have been described herein for the purposes of illustration, it will be apparent to those skilled in the art that modification therein may be made without departing from the spirit and scope of the present invention.

What is claimed is:

1. An artificial fishing lure comprising:
   an elongated unitary body having an S-shaped top profile, said body including line attaching means for attaching said body to fishing line;
   at least one hook; and
   hook attaching means for attaching said at least one hook to said body.

2. The fishing lure of claim 1, wherein said body includes a front head portion, a rear tail portion, a bottom belly portion, a top back portion, and two side portions.

3. The fishing lure of claim 2, wherein said hook attaching means comprises a hook eyelet, located along said belly portion of said body.

4. The fishing lure of claim 2, wherein said hook attaching means comprises a hook eyelet, located along said rear tail portion of said body.

5. The fishing lure of claim 2, wherein said hook attaching means comprises a first hook eyelet located along said belly portion of said body and a second hook eyelet located at said rear tail portion of said body.

6. The fishing lure of claim 2, wherein said bottom portion, said side portions, said top portion, said tail portion, and said front portion are patterned such that said lure presents multiple appearances.

7. The fishing lure of claim 2, wherein said hook attaching means comprises a plurality of hook eyelets.

8. The fishing lure of claim 1, wherein said line attaching means includes an eyelet.

9. The fishing lure of claim 8, wherein said eyelet is located at a front portion of said body such that said S-shaped body imparts a partial rotation of the lure about a longitudinal axis of said lure and causes said lure to follow an arcuate path when drawn through water.

10. The fishing lure of claim 8, wherein said body further includes a diving lip extending forwardly from a front portion of said body.

11. The fishing lure of claim 10, wherein said body integrally forms said diving lip.

12. The fishing lure of claim 10, wherein said eyelet extends outwardly from and is forwardly located along a side portion of said body such that said diving lip and eyelet cooperating to cause said lure to fully rotate about said longitudinal axis while simultaneously diving and surfacing when drawn through water by a fishing line attached to said eyelet.

13. The fishing lure of claim 10, wherein said line attaching means comprises a front eyelet located at a front portion of said lure and a side eyelet forwardly located along a side portion of said lure such that attachment of said fishing line may be changed between said front eyelet and said side eyelet.

14. The fishing lure of claim 1, wherein the body comprises a forward arced portion arcing to a first side and a rearward arced portion arcing to a second side such that said forward arced portion and said rearward arced portion each subtend an angle of 35±15 degrees.

15. An artificial fishing lure comprising:
   an elongated, S-shaped body having
      a forward arced portion arcing to a first side and a rearward arced portion arcing to a second side, said forward arced portion and said rearward arced portion each subtending an angle of 35±15 degrees; and
   line attaching means, located at a front portion of said lure, for attaching said body to fishing line such that said S-shaped body imparts a partial rotation of the lure about a longitudinal axis of the lure and causes the lure to follow an arcuate path when drawn through water;
   at least one hook; and
   hook attaching means for attaching said at least one hook to said body.

16. The fishing lure of claim 15, wherein said lure further includes a diving lip extending forwardly from a front portion of said lure.

17. An artificial fishing lure comprising:
   an elongated unitary body having an S-shaped top and bottom profile, said body having a forward line eylet located at the front of the lure, a side line eyelet located along a side of the lure and extending outwardly from said side, and a diving lip located at said front of said lure;
   wherein said forward and said side line eyelets are each capable of receiving fishing line such that said lure may present multiple in-water actions; and
   wherein said side line eyelet and said diving lip cooperate to fully rotate said lure about a longitudinal axis of said lure while simultaneously causing said lure to dive and surface when drawn through water by fishing line attached to said side line eyelet.

* * * * *